May 12, 1970     E. O. AMMANN     3,511,556

OPTICAL POLARIZING PRISM

Filed Nov. 30, 1967

INVENTOR.
EUGENE O. AMMANN

BY *John F. Lawler*
ATTORNEY

United States Patent Office
3,511,556
Patented May 12, 1970

3,511,556
OPTICAL POLARIZING PRISM
Eugene O. Ammann, Mountain View, Calif., assignor to Sylvania Electric Products Inc., a corporation of Delaware
Filed Nov. 30, 1967, Ser. No. 686,981
Int. Cl. G02b 5/30, 1/08
U.S. Cl. 350—157
2 Claims

ABSTRACT OF THE DISCLOSURE

A Glan-Thompson type polarizing prism is constructed by substituting an isotropic medium such as glass for one-half of the prism. The glass has an index of refraction equal to the index of refraction in calcite for an ordinary ray ($n = 1.655$ for a wavelength of 0.643 micron). When the glass is substituted for the front half of the prism, i.e., the section of the prism on which the light is incident, the device functions as a Glan-Thompson polarizer. When light is passed in the opposite direction through the polarizer, it functions as a Rochon prism.

BACKGROUND OF THE INVENTION

This invention relates to optical polarizers and more particularly to an improved construction of a Glan-Thompson polarizer.

An exceedingly popular birefringent material used in various types of optical polarizers and analyzers is Iceland spar or calcite, chemically defined as calcium carbonate ($CaCO_3$). The increasing demands for this mineral and the limited supply available has been responsible for a rising price of the material and a corresponding increase in cost of prisms made from it.

Various attempts have been made over the years to conserve the amount of Iceland spar needed for various optical prisms. It has been suggested, for example, that a Nicol prism be modified by replacing the rear section of the prism with glass having an index of refraction as nearly as possible equal to that of the index of refraction of calcite for the extraordinary ray. These approaches have not met with success primarily because of image distortion in the transmitted extraordinary ray. This distortion occurs because the transmitted ray is an extraordinary ray in the calcite portion of the prism. As a result, the beam emerging from the prism will in general not be parallel to the input beam, and the extent of its angular deviation will depend upon its angle of entry into the prism.

An object of the invention is the provision of a distortionless Glan-Thompson prism which substantially reduces the quantity of calcite required for the prism and therefore is economical to produce.

Another object is the provision of a dual purpose optical prism that functions as a Glan-Thompson prism for light propagating in one direction and as a Rochon prism for light propagating in the opposite direction.

SUMMARY OF THE INVENTION

In accordance with this invention, the front half of a Glan-Thompson prism is replaced by glass having an index of refraction equal to that of calcite for the ordinary ray, namely, $n = 1.655$. The extraordinary ray is thereupon reflected at the junction of the glass front section with the calcite rear section while the ordinary ray is transmitted undeviated through the prism. A variation in the direction of propagation of the light beam through the prism from the axis of the prism does not cause image distortion since the index of refraction for the ordinary ray is not propagation-axis dependent. Therefore, conservation of calcite needed to make the prism without impairment of the efficiency of the prism is achieved.

This prism acts as a Glan-Thompson prism for propagation of light through the glass section initially and as a Rochon prism for reverse direction of propagation of the light thereby providing two separate functions with the same structure.

DESCRIPTION OF PREFERRED EMBODIMENT

Figure 1:
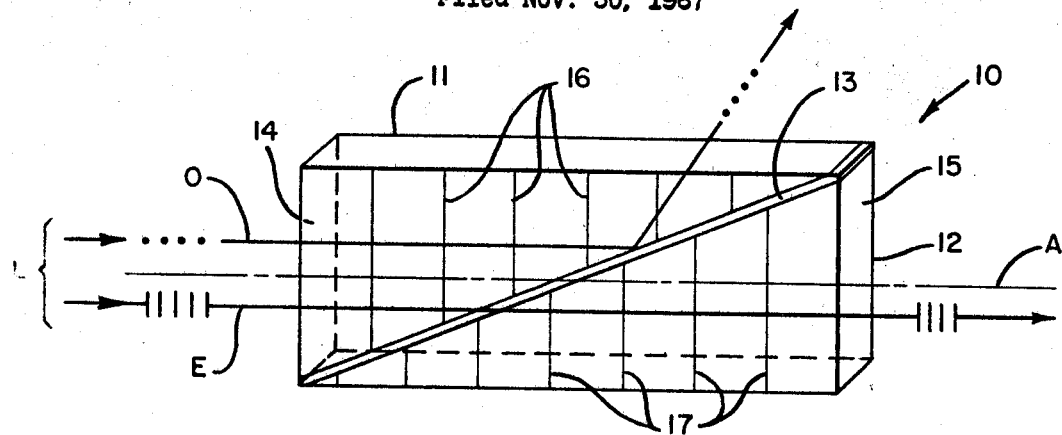
FIG. 1 is a perspective schematic view of a Glan-Thompson prism of the prior art showing the separation of the ordinary and extraordinary rays of a light beam passing through it.
Figure 2:
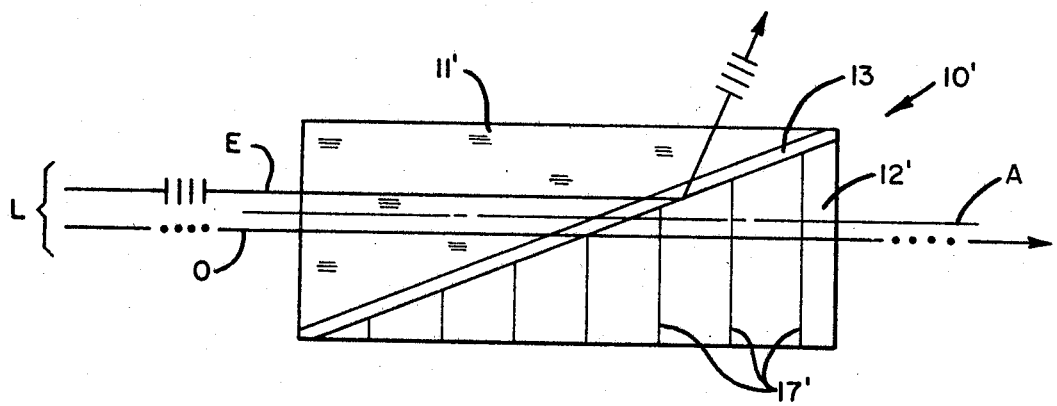
FIG. 2 is a schematic view of a prism embodying this invention.

A conventional Glan-Thompson prism 10 shown in FIG. 1 is a rectangular polyhedron divided into two substantially identical triangularly shaped sections 11 and 12 joined together along a diagonal plane by an optical cement 13. Sections 11 and 12 of the prism consist of a birefringent substance, preferably calcite, cut in such a manner that their optic axes are parallel to each other and to the end faces 14 and 15 respectively of the prism. The directions of the optic axes of sections 11 and 12 are indicated by the parallel lines 16 and 17, respectively. It will be noted that the plane of the junction of the two sections extends transversely of the optic axes of these sections.

For the purpose of explanation of the action of this prism, consider a light beam L which is directed into the prism through and perpendicular to end surface 14 and parallel to the axis A of the prism. The light beam typically has two components of rays O and E vibrating or polarized in perpendicular directions. The O ray is shown, as being polarized perpendicular to the optic axes of the crystals and is known as the ordinary ray. The E ray is polarized parallel to the optic axes of the crystal and is known as the extraordinary ray. It will be understood that the birefringent material in effect divides the light beam into the ordinary and extraordinary rays since the material has different indices of refraction for these rays. Therefore, the illustration of the dual ray light beam in the drawings is for the purpose of explanation of the prism function.

The optical cement 13 has an index of refraction equal to or less than that of the birefringent material for the extraordinary ray. For calcite, this index is designated $n_e$ and is equal to 1.485. The index of refraction in calcite for the ordinary ray is $n_o$ and equals 1.655.

Since the O ray propagation in prism section 11 experiences or "sees" an index of refraction that is substantially greater than the index of refraction of the cement 13, the criterion for total internal reflection is met and the O ray is totally reflected as the junction plane as indicated. The E ray propagating in the prism "sees" an index of refraction $n_e$ that is the same in prism sections 11 and 12 and in cement layer 13 and therefore propagates through the entire prism parallel to the axis A.

In accordance with this invention, prism section 11, FIG. 1, is replaced with a section 11′ composed of an isotropic medium such as glass having an index of refraction $n_o$ equal to the index of refraction $n_o$ of birefringent material in section 12′ for the ordinary ray. The cement 13′ between sections 11′ and 12′ is selected to have an index of refraction approximately equal to $n_o$ of the section 12'. Cement 13' having a desired index of refraction is available on the commercial market. For example, a suitable optical cement having an index of refraction $n=1.65$ is sold under the trademark "Hydrax" by Van Waters & Rogers, 3745 Bayshore Blvd., San Francisco, Calif. Alternatively, the two sections of the prism may be secured together without cement through optical polishing of the mating surfaces and the joining of those surfaces under slight pressure. This process is known as optical contacting.

Prism 10' functions in a manner to divide the O and E rays by totally reflecting the E ray and allowing the O ray to transmit through the prism parallel to the prism axis. Since the E ray "sees" an index of refraction $n_o$ in section 11' and cement 13' that is higher (greater) than the index of refraction $n_e$ that it sees in section 12', the criterion for total internal reflection is met and the E ray is totally reflected at the junction surface of section 12' as indicated. The O ray "sees" the same index of refraction $n_o$ in section 11' and 12' and in the cement 13' and therefore is transmitted through the entire prism parallel to axis A.

An important feature of the invention in addition to the conservation of calcite used in its construction is the ability of the prism to function without distortion as a polarizer of light that deviates from the axis of the prism. This advantage is obtained because the index of refraction $n_o$ in section 12' does not vary for the O ray which deviates from the axis propagation. By way of comparison, the index of refraction $n_e$ in calcite varies from 1.485 for on axis propagation to 1.502 for a 20 degree deviation whereas for the same deviation, $n_o$ is unchanged.

Figure 3:
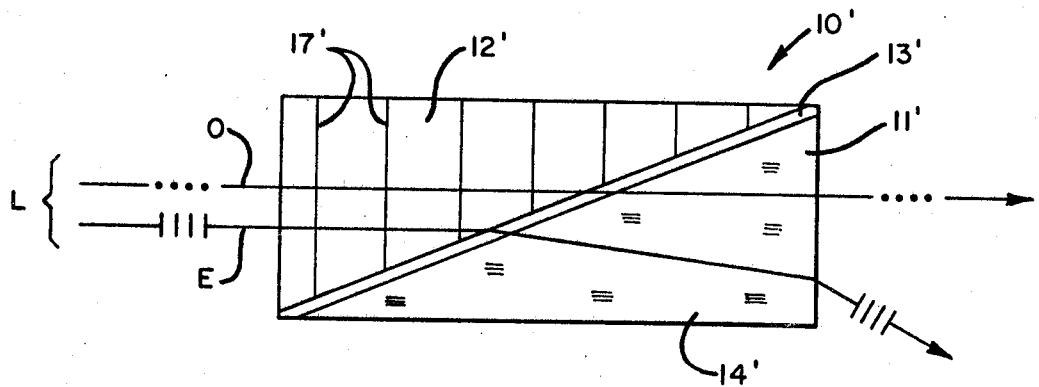
FIG. 3 is a view similar to FIG. 2 showing the effect on the defraction of light when the prism is reversed end for end.

In some optical applications, it is desirable to separate the ordinary and extraordinary rays by refraction rather than by reflection and for this purpose a Rochon or Wollaston prism may be used. Another feature of the invention is that by reversing the direction of passage of light through the prism 10' the extraordinary ray may be refracted instead of reflected and the ordinary ray is transmitted on line through the prism. This function of the prism is shown in FIG. 3 wherein the extraordinary ray E passing from prism section 12' having an index of refraction $n_e$ less than the index of refraction $n_o$ of the cement 13' is refracted at the interface with the cement and passes through end face 14' of section 11' as shown. The ordinary ray O propagates through the entire prism without deviation.

Changes, modifications and improvements may be made to the above described preferred embodiment of the invention without departing from the scope of the invention. The claims describe the novel features of the invention.

I claim:
1. An optical prism adapted to separate an incident beam of light into extraordinary and ordinary rays comprising
   two prism sections joined together along a plane inclined with respect to the direction of propagation of said incident light beam,
   one of said prism sections being composed of calcite oriented with its optic axis extending in a direction transversely of said plane and normal to the direction of the incident light beam,
   the other prism section being composed of an isotropic medium having an index of refraction equal to the index of refraction $n_o$ of calcite for an ordinary ray propagating therethrough.
2. The prism according to claim 1 in which said other section is glass.

References Cited

UNITED STATES PATENTS

Re. 26,506  12/1968  Rogers _____ 350—157

OTHER REFERENCES

Hardy, "A New Recording Spectrophotometer," J.O.S.A., vol. 25 (September 1935), pp. 305–311.

Jenkins and White, "Fundamentals of Optics," 3rd ed. (McGraw-Hill Book Company, Inc., New York, 1957), pp. 535–540.

DAVID SCHONBERG, Primary Examiner

P. R. MILLER, Assistant Examiner

U.S. Cl. X.R.
350—147, 152